Oct. 22, 1963 B. R. LESTER 3,108,255

CODED INFORMATION TRANSMIT-RECEIVE COMMUNICATIONS SYSTEM

Original Filed Oct. 1, 1952 2 Sheets-Sheet 1

INVENTOR:
BURTON R. LESTER,
BY Richard V. Lang
HIS ATTORNEY.

CODED INFORMATION TRANSMIT-RECEIVE COMMUNICATIONS SYSTEM

Original Filed Oct. 1, 1952 2 Sheets-Sheet 2

INVENTOR:
BURTON R. LESTER,
BY Richard V. Lang
HIS ATTORNEY.

United States Patent Office 3,108,255
Patented Oct. 22, 1963

3,108,255

CODED INFORMATION TRANSMIT-RECEIVE COMMUNICATIONS SYSTEM

Burton R. Lester, Baldwinsville, N.Y. (5 Sage Drive, Warren Township, R.D., Plainfield, N.J.)

Original application Oct. 1, 1952, Ser. No. 312,516, now Patent No. 2,845,616, dated July 29, 1958. Divided and this application Nov. 29, 1957, Ser. No. 703,470
7 Claims. (Cl. 340—150)

My invention relates to communications systems, and more particularly, to such systems in which stereotyped messages to be communicated between selected stations are preliminarily encoded and transmitted as a pulse-modulated carrier, to a distant receiver at which the coded message is detected and decoded to provide a visual indication of the message. This application is a division of U.S. application, Serial No. 312,516, which has issued as U.S. Patent 2,845,616.

An object of the invention is to provide a novel communications system in which a considerable reduction in transmitter time can be effected by coding individual messages of a selected group of stereotyped messages and then transmitting only the code designation of the message.

Another object of the invention is to provide a communications system of the type referred to, wherein the received messages are displayed for visual observations, whereby the time required for receiving is only long enough to place into operation a decoding mechanism.

A further object of the invention is to provide a communications system of the herein-mentioned type in which the receiving apparatus and the transmitting apparatus are substantially identical, and further wherein the apparatus for coding the message can be used, without modification, for decoding the received message.

Still another object is to provide a system of the type mentioned having pulse-transmitting means and pulse-receiving means and means operable on the actuation of said transmitting means to render inoperative said receiving means throughout the period of pulse transmission.

Yet another object is to provide a novel and improved coding and decoding mechanism having a first part operable to translate data in a decimal form into a binary digital representation and a second part operable to translate data in binary digital form into a decimal form, said mechanism including means for rendering said first part inoperative throughout the period of operation of said second part.

Figure 1A:
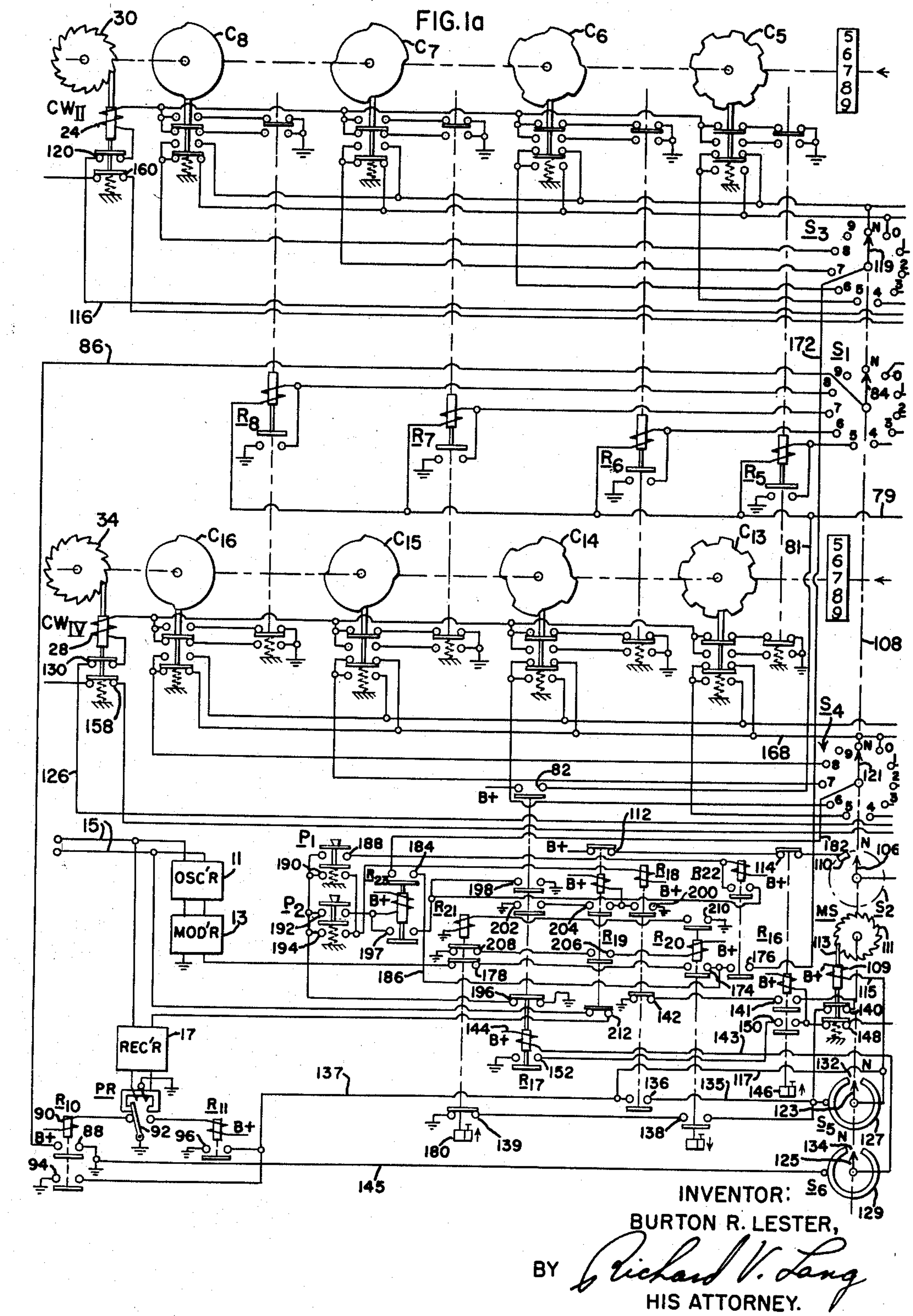
Figures 1B, 2:
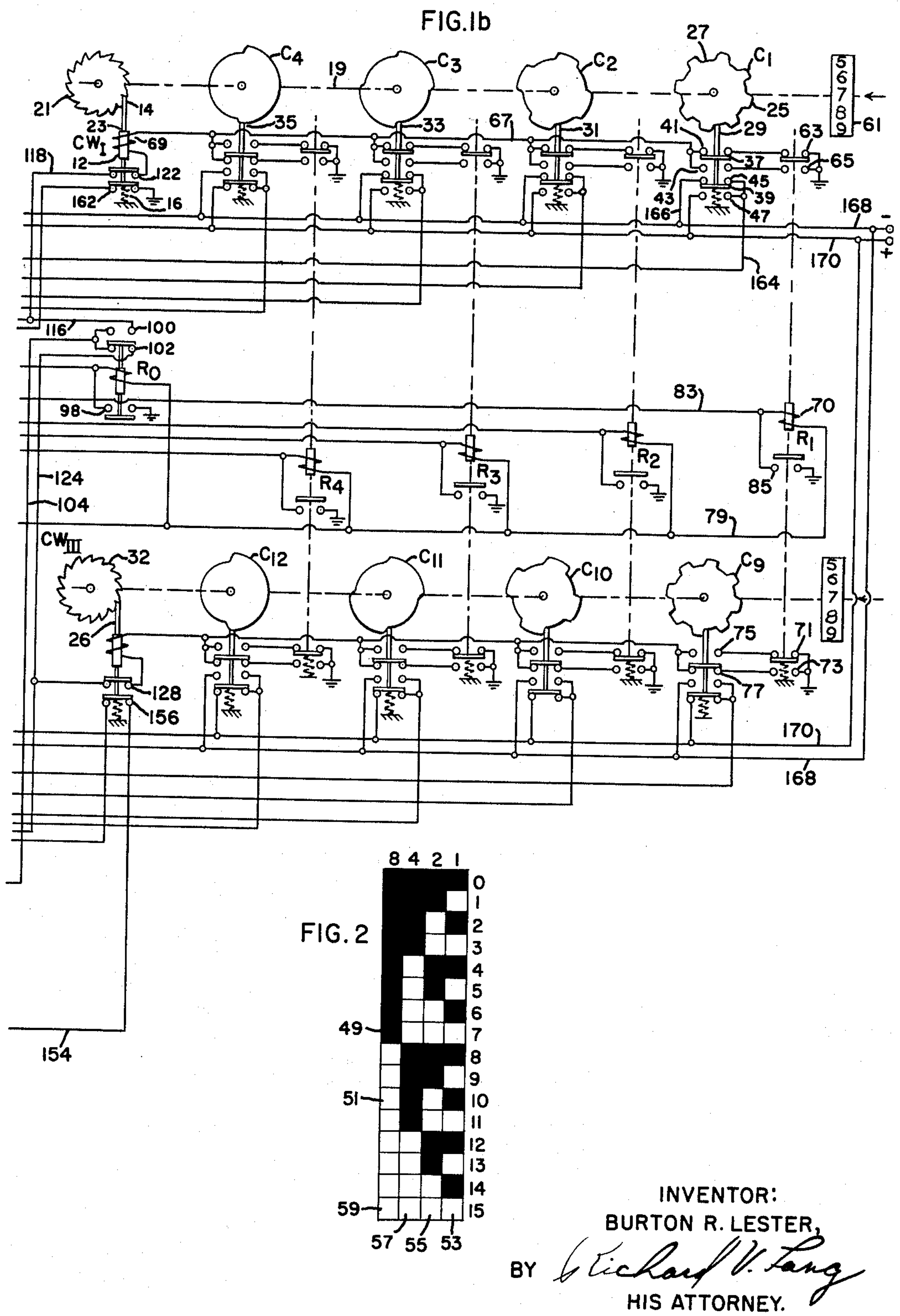

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which:

FIGS. 1*a* and 1*b*, read in side by side relation, illustrate a complete transmit-receive station according to the invention, and FIG. 2 is a diagram representing a sequence in the binary system of numeration employed in the coder-decoder apparatus of the invention.

A communication system according to this invention may comprise a plurality of transmit-receive stations, each station being identically constituted and adapted to transmit and receive, at any given instant, a selected one of a plurality of predetermined or stereotyped messages. The system can be generally employed whenever and wherever it is required to transmit a large number of such messages to a number of individual receivers, and in one practical embodiment, one such station was located on the ground, and other stations were mounted in aircraft providing a communication, navigation, traffic control and ground-to-air transmitting link. Such a link, it will be noted, is capable of sending both information and control signals to one or more aircraft within the line of sight of one radio-frequency channel.

For the purpose of simplifying the present description, the number and types of stereotyped messages that can be transmitted and received has been arbitrarily reduced to indicate generally the scope of the apparatus without unnecessarily burdening the description with repetitive details. Thus, in the description that follows, it will be considered that information concerning "bearing" and "elevation" only are desired to be transmitted and that for each type of information there are 256 different predetermined messages that can be sent. It will, of course, be understood that these types and numbers of messages are exemplary only and that other types and numbers can be employed, as for example, distance, temperature, and related data as well as a variety of commands and order such as "Report," "Repeat," "Identify," etc.

In FIGS. 1*a* and 1*b*, a transmit-receive station is shown comprising an oscillator 11, shown in the lower left-hand corner of FIG. 1*a*, which may be of any suitable conventional type for producing radio-frequency oscillations at a desired frequency value. The oscillator 11 is adapted to be keyed by a modulator 13, which may also be of any suitable conventional variety to cause the emission by oscillator 11 of positive and/or negative pulses at a suitable rate, say from 20 to 30 pulses per second, over a bandwith of from 200 to 300 cycles per second. A train of pulses including, in the illustrated embodiment, 10 equi-amplitude equi-duration and equi-spaced pulses of positive and/or negative polarity, carries the message or intelligence to be transmitted coded in binary form, and such a train is applied to an antenna (not shown) by means of transmission line 15. Similar trains of pulses, radiated from another station, after reception by the antenna, are fed to receiver and detection apparatus 17 for subsequent decoding and visual presentation.

The elements of my coder-decoder apparatus by means of which the message or intelligence to be transmitted is coded in binary form preliminarily to actuation of the modulator 13, and which also functions to decode the received pulse train to yield the intelligence conveyed thereby, will now be described in detail.

The coder-decoder apparatus comprises four coding-wheel assemblies $CW_I$, $CW_{II}$, $CW_{III}$, $CW_{IV}$ which are identically constructed and operate in identical fashion to translate data, information or intelligence of any type or form into a binary digital form and conversely to translate such data, information or intelligence in binary digital form into its original form. The assemblies $CW_I$ and $CW_{II}$, in the illustrative embodiment, are for accommodating intelligence of the first type, say elevation, and assemblies $CW_{III}$ and $CW_{IV}$ are for accommodating intelligence of the second type, say bearing. Additional assemblies can, of course, be provided where it is desired to accommodate additional types of intelligence.

As noted, the coder-wheel assemblies are identical in construction and in mode of operation. Accordingly, the construction of one such assembly, say assembly $CW_I$, will be described in detail, it being understood that the corresponding elements of the other assemblies are similarly constructed for similar operation.

Coder-wheel assembly $CW_I$ comprises an array of rotatable cams $C_1$, $C_2$, $C_3$ and $C_4$ mounted for conjoint rotation on a common shaft 19 which also carries a ratchet 21 of a stepping switch 23. The stepping switch 23 can be of any suitable type well known in the art and having a movable core 12 that carries a pawl 14 in engagement with the ratchet 21 so that, when the winding is energized, the core 12 is drawn downward against the action of a spring carrying the pawl into engagement with the next tooth of the ratchet 21. The downward movement of the core also opens interrupter contacts, subsequently to be described, thereby breaking the energizing circuit of the winding. The core is thereupon returned to its unattracted position by means of the spring 16, causing the pawl 14 to notch or step the ratchet 21 one step. Cam $C_1$ is formed with eight equi-angularly spaced high portions as at 25 and an equal number of equi-angularly spaced low portions as at 27 interspersed between the high portions 25. Cam $C_2$, adjacent cam $C_1$ is formed with one half the number or four high and low portions, and cams $C_3$ and $C_4$ are respectively similarly formed with half the number of high and low portions of the cams next adjacent thereto. Associated with each cam are respective spring-biased cam followers 29, 31, 33 and 35 each of which carries a pair of contactors, as at 37 and 39 for actuating respective pairs of contacts 41, 43 and 45, 47. It will be noted that one contact of each pair of contacts is normally open and the other is normally closed.

The coder-wheel assemblies $CW_{II}$, $CW_{III}$ and $CW_{IV}$ are similarly constituted of identically arranged sets of cams, identified as cams $C_5$, $C_6$, $C_7$ and $C_8$ in assembly $CW_{II}$; $C_9$, $C_{10}$, $C_{11}$, and $C_{12}$ in assembly $CW_{III}$; and $C_{13}$, $C_{14}$, $C_{15}$ and $C_{16}$ in assembly $CW_{IV}$.

The stepping-switch and ratchets in the assemblies $CW_{II}$, $CW_{III}$, and $CW_{IV}$ are also similar to corresponding elements of assembly $CW_I$, and these are identified in the drawing by the numerals 24, 26, and 28 referring to the stepping-switches and numerals 30, 32, and 34 referring to the ratchets.

The position of a given cam will, for this description, be regarded as "normal" when the associated follower is on a high portion of the cam and the open or closed condition of the related contacts will be determined accordingly. Thus, in the illustration, cam $C_1$ is in the "actuated" condition, since the follower 29 is at a low portion 27 of the cam. Hence, the contacts 41 and 45, which are normally open, are presently in closed condition. The cam $C_4$ is instantly in the normal position.

The arrangement of the high and low portions 25 and 27 on the cams $C_1$–$C_4$, is diagrammatically shown in developed form in FIG. 2, in which shaded areas, as at 49, correspond to the high portions 25 and unshaded areas, as at 51, correspond to the low portions 27. The developed representation of FIG. 2 thus consists of four vertical columns 53, 55, 57 and 59 of alternatively spaced shaded and unshaded areas, the column 53 containing eight shaded areas and eight unshaded areas, the column 55 containing four shaded and four unshaded areas, column 57 having half the number found in column 55, and column 59 having half the number found in column 57.

If, in the diagram of FIG. 2, the shaded areas represent zeros and the unshaded areas represent ones, there is thus presented a representation of a binary sequence in which the horizontal rows considered from top to bottom correspond to 0000, 0001, 0010, 0011, etc. corresponding respectively to the decimal numbers 0, 1, 2, 3, etc., shown at the right hand edge of the diagram. The numbers "1," "2," "4," and "8" across the top of the diagram, indicated by the presence of an unshaded area at the intersection of a given row and the respective column, the presence of the corresponding decimal number. Thus, in the row corresponding to decimal 13 or binary 1101, non-shaded areas are found in the "8" column, the "4" column and the "1" column, indicating the presence of an 8, a 4, and a 1 in the decimal number, which together make up the decimal 13.

Returning now to FIGS. 1*a* and 1*b*, it will be seen that the instant setting of the cams $C_1$–$C_4$ of coding-wheel assembly $CW_I$, with the follower 35 of cam $C_4$ on a high portion and the followers 31, 33 and 35 of the wheels $C_3$, $C_2$ and $C_1$ on low portions, when interpreted in view of the binary sequence diagram of FIG. 2, corresponds to a binary 0111 or decimal 7, and the decimal number 7 is, accordingly, found on an indicia wheel 61 that is mounted on the cam shaft 19 for rotation with the cams $C_1$–$C_4$. Also, it will be observed that when $C_1$–$C_4$ are rotated one notch, as by the actuation of the stepping-switch 23, the follower 35 of cam $C_4$ will have dropped to the low portion of the cam $C_4$ while the followers 33, 31 and 29 of the cams $C_3$, $C_2$ and $C_1$ will have been raised to high portions of the respective cams, so that the setting of the coding wheel assembly $CW_I$ now corresponds to the binary 1000 or decimal 8.

The description just completed of the construction of coder-wheel assembly $CW_I$ whereby the instant setting of the cams $C_1$–$C_4$ corresponds to a predetermined binary number, which in turn is translatable into a corresponding decimal number applies identically to the coder-wheel assemblies $CW_{II}$, $CW_{III}$ and $CW_{IV}$, the latter assemblies being of essentially the same form as assembly $CW_1$.

There follows now a description of the circuit connections of the individual contacts of the cam switches of respective pairs of coder-wheel assemblies, and for simplification of the description, only representative connections will be described, it being clear that the corresponding connections for the remaining cam switches are similarly made.

Thus, turning again to coder-wheel assembly $CW_1$, and particularly the upper pair of cam actuated contacts 41 and 43, it will be observed that said contacts 41 and 43, here shown actuated, are respectively serially connected to normally closed and normally open relay-operated contacts 63 and 65. The series-connected contacts 41 and 63 are connected in shunt with the series-connected contacts 43 and 65, one side of the shunt arrangement being grounded and the other side being connected, as by conductor 67, to the winding 69 of the stepping switch 23.

The contacts 63 and 65 are actuatable by means of an electromagnetic relay $R_1$, which as shown, is the extreme right-hand one of a bank of eight similar electromagnetic relays $R_1$–$R_8$, which function as data storage devices employed in the message-reception phase of the transmit-receive station of this invention. Each relay of the bank $R_1$–$R_8$ is provided with a winding, as at 70 for relay $R_1$, which upon energization, operates to actuate a pair of relay contacts associated with the uppermost pair of cam contacts of each of a pair of cam elements in the coder-wheel assemblies. Thus, relay $R_1$ controls the actuation of the relay contacts 63 and 65 that are respectively connected to the cam contacts 41, 43 of cam $C_1$ in assembly $CW_I$. Relay $R_1$ also controls the actuation of a second pair of relay contacts 71, 73 that are connected to cam contacts 75, 77 of the cam $C_9$ in coder-wheel assembly $CW_{III}$.

For a reason that will become more apparent as the description of the structure and operation of the apparatus proceeds, the uppermost pair of cam contacts of each cam $C_1$–$C_{16}$, such as the contacts 41, 43 of cam $C_1$ and contacts 75, 77 of cam $C_9$ are termed "sensing contacts" inasmuch as these contacts operate to sense the potential at one terminal of the winding of the associated relay $R_1$. As shown in the case of relay $R_1$, for example, one terminal of the winding 70 thereof is connected, as by conductors 79 and 81, through a normally open relay contact 82, to a source of positive potential, conventionally indicated by B+, the other terminal of winding 70 being connected, as by conductor 83, to a tap marked "1" on a multiposition switching element $S_1$ having a movable wiper 84. A holding contact 85 for relay $R_1$ is connected between the conductor 83 and ground so that, upon impulse energization of relay $R_1$ by a pulse of positive polarity in a manner subsequently to be described, the contact 85 is made, and if contact 82 is in closed condition, the relay $R_1$ is sealed in through a circuit extending from B+, through contact 82, conductors 81 and 79, winding 70 and contact 85 to ground.

It will be helpful to note for the present that a relay $R_{10}$ shown in the lower left-hand portion of FIG. 1*a* is provided with a winding 90 one terminal of which is connected to B+ and the other is adapted to be connected to ground through the armature 92 of a polarized relay PR. As shown, the winding of the polarized relay PR is adapted for energization by the pulsed output of the receiving apparatus 17, which as noted above, comprises a pulse train of positive and negative pulses according to the information or intelligence contained in the received message. The relay PR is polarized so that a positive received pulse causes deflection of the armature 92 to the left resulting in the energization of relay $R_{10}$ and the consequent actuation of contact 88 as well as a second contact 94. A negative received pulse causes deflection of the armature 92 to the right resulting in the energization of a relay $R_{11}$ the energization of which closes a contact 96, the function of which is subsequently to be described.

Returning now to the bank of relays $R_1$–$R_8$, it will be seen that one terminal of the winding of each relay is connected to a respective tap of the switch $S_1$, the taps being appropriately marked "2" for relay $R_2$, "3" for relay $R_3$, etc., so that as the wiper 84 is stepped around, contact is made successively with the winding of each relay $R_1$–$R_8$, the other terminal of each winding being connected in common, by conductors 79 and 81, through contact 82, to B+.

Switch $S_1$ is provided with three additional taps marked "9," "N" and "0," respectively, the "9" and "N" taps being open and corresponding to the "power" stage and "home" or normal position, respectively, of the switch, as will appear. The "0" tap is connected to one terminal of the winding of a message-selector relay $R_0$, the other terminal of said winding being connected to the common connection formed by conductors 79 and 81. Relay $R_0$ is also provided with a holding contact 98 similar to the holding contacts of the storage relays $R_1$–$R_8$, as exemplified by contact 85 of relay $R_1$, and in addition, relay $R_0$ actuates a pair of contacts 100 and 102, one of which is normally closed and the other normally open. One side of each of the contacts 100 and 102 are connected jointly, by conductor 104 to the wiper 106 of a power control switch $S_2$ for the coder-wheel assemblies $CW_I$–$CW_{IV}$ the wiper 106 and wiper 84 being mounted on a common axis, indicated at 108, for conjoint rotation. The switch $S_2$ is provided with a single segmental contact 110 disposed in a position corresponding to the number "9" position of the switch $S_1$ so that when the wipers 84 and 106 step off the "8" position and on to the "9" position, a circuit is made from B+ through normally closed contacts 112 and 114 of a pair of relays $R_{19}$ and $R_{16}$, respectively, to be described hereinbelow.

The other sides of the contacts 100 and 102 of the message selector relay $R_0$ are connected to the windings of selected pairs of the stepping switches in the coder-wheel assemblies $CW_I$–$CW_{IV}$. Thus, contact 100 is connected in common to windings of stepping switches 23 and 24 of assemblies $CW_I$–$CW_{II}$, respectively, the connection being affected through conductors 116 and 118 and normally-closed interrupter contacts 122 and 120 of the switches 23 and 24, respectively.

Similarly, the contact 102 is connected in common to the windings of stepping switches 26 and 28 of assemblies $CW_{III}$ and $CW_{IV}$, respectively, these connections being effected through conductors 124 and 126 and normally-closed interrupter contacts 128 and 130 of the switches 26 and 28, respectively.

The stepping action of wipers 84 and 106 of switches $S_1$ and $S_2$, respectively, is accomplished by means of a master stepping switch arrangement MS, comprising a conventional stepping switch having a winding 109 and a ratchet 111, the latter being suitably mounted on the axis 108 to produce rotative movement thereof. In a manner well known to those skilled in the art, energization of the winding 109 from a suitable source, here indicated conventionally by B+, causes an armature-pawl 113 to be drawn down a notch of the ratchet compressing a spring so that, upon deenergization of the winding 109, the pawl is pushed upward stepping the ratchet around one step or notch. The circuit from B+ through the winding 109 is completed to ground by means of conductors 115, 117, and 137, and either of the contacts 94 and 96 of relays $R_{10}$ and $R_{11}$, respectively, depending on which of the two is actuated. It will be recalled that contact 94 is closed in response to a positive pulse and contact 96 is closed by a negative pulse. Thus, pulses of either polarity are effective to close one or the other of the contacts 94 or 96 causing the energization of winding 109 of the master stepping switch MS, which, in turn, produces stepping movement of the ratchet 111. The step-by-step rotation of the ratchet 111 results in a corresponding movement of the axis 108 and the wipers 84 and 106, as well as wipers 119, 121, 123 and 125 of associated rotary switches $S_3$, $S_4$, $S_5$ and $S_6$, respectively. As shown, all the wipers are ganged on the axis 108 for conjoint movement in response to stepping or notching of the switch MS.

Since the switches $S_3$ and $S_4$ are utilized in the message-transmission phase of the operation of the system, the description of the circuitry associated therewith will be given later hereinbelow.

Switches $S_5$ and $S_6$ are "off-normal" contacts, so-called, inasmuch as they provide open contacts when the master stepping switch MS, as evidenced by the position of the wipers 84, 106 and 119, is in the normal position N, and provide closed contacts for all other positions of the master switch. To that end, the switches $S_5$ and $S_6$ may each be formed with a substantially circular conductive strip 127 and 129 having insulated gaps 132 and 134, respectively, at positions thereon corresponding to the normal position N.

As shown, off-normal contact $S_5$ is connected, as by conductor 117 and a conductor 135 across a normally-open relay-operated contact 136 and the shunt pair is connected at one side to B+ through the winding 109 of the master stepping switch MS. The same side of the shunt-connected contacts $S_5$ and 136 is connected to ground, as by conductor 137, through the contacts 94 or 96 of relays $R_{10}$ or $R_{11}$, respectively.

The other side of the shunt-connected contacts $S_5$ and 136 is connected to ground through either of a pair of branched paths, one said path including a series connection of a normally-open relay contact 138 and a normally-closed relay contact 139. The other path to ground is provided by a series connection of a normally-closed interrupter contact 140 of the master stepping switch MS, a normally-open relay contact 141 and a normally-closed relay contact 142. Relay contact 141 is operated by a time-delayed operating relay $R_{16}$ having a conventional means, such as a dashpot 146 for delaying the operation of the relay by a predetermined short time interval. Contact 142 is operated by relay $R_{18}$.

Off-normal contact $S_6$ is connected, at one side, to B+ by conductor 143 through the winding 144 of a relay $R_{17}$, and on the other side to ground by conductor 145. The grounded side of the off-normal contact $S_6$ is also connected, through the normally-open contact 88 of relay $R_{10}$ and conductor 86, to the wiper 84 of switch $S_1$.

To complete the description of so much of the system as is utilized in the reception of a message, it will be noted that the master stepping switch MS is provided with a second interrupter contact 148 which on one side is connected to B+ through the winding of the relay $R_{16}$ and to ground through a normally-open contact 150 of relay $R_{16}$ in series with normally-open contact 152 of relay $R_{17}$. The other side of interrupter contact 148 is connected to ground through conductor 154 and a series connection of normally-closed second interrupter contacts 156, 158, 160 and 162 of the stepping switches 26, 28, 24 and 23, taken in that order.

The operation of the receiving portion of the system described to this point can now be explained with reference to a received message. As noted above, a message consists of 10 pulses each of which can be positive or negative according to the intelligence contained therein. Also, the polarized relay PR is poled to effect energization of relay $R_{10}$ in response to the reception of a positive pulse and to effect energization of relay $R_{11}$ in response to reception of a negative pulse.

In the quiescent period, before the reception of any pulse, only the winding of relay $R_{16}$ is energized, the energization thereof being effected by the circuit extending from B+, the winding of relay $R_{16}$, interrupter contact 148 of the master stepping switch MS, conductor 154, and the interrupter contacts 156, 158, 160 and 162 of the coder-wheel assembly stepping switches. All the other relays and all the stepping switches are deenergized, and all the wipers of the switches $S_1$–$S_6$ are on the normal position N.

Now, if a pulse of either polarity is received, so that either contact 94 or contact 96 is closed, winding 109 of the master stepping switch MS is energized through conductors 115, 117 and 137, and at the termination of the pulse, the ratchet 111 is stepped one notch moving all the wipers off the normal position N, wiper 84 of switch $S_1$ contacting the 0 tap, and wipers 123 and 125 contacting the segments 127 and 129, respectively, thus closing the off-normal contacts $S_5$ and $S_6$. The closing of contact $S_6$ results in the energization of relay $R_{17}$ and the opening of the interrupter contact 148 results in the deenergization of $R_{16}$.

In the interval between the termination of the first pulse and the reception of a second pulse, winding 109 of switch MS is deenergized and the interrupter contact 148 is again closed by the upward thrust of the armature-pawl 113, again energizing the winding of relay $R_{16}$. But, as noted, relay $R_{16}$ is delayed a short time interval in its operation by the dashpot 146, so that its contacts are not instantly closed. Thus, if a second pulse is received before the contacts of relay $R_{16}$ are closed, the switch MS is stepped a second notch thereby in exactly the same manner as just described.

However, it may happen that the first pulse received is merely a random noise pulse and not followed by a second pulse and successive pulses in regular order and timing. In that case, assuming no pulse is received after the first by the time that relay $R_{16}$ has operated to close the contact 150, the reenergization of relay $R_{16}$ results in the sealing in of the relay $R_{16}$ through the closed contact 150 and the actuated contact 152 of relay $R_{17}$. Then, since contact 141 of relay $R_{16}$ and off-normal contact $S_5$ are both closed, the master stepping switch MS is interruptedly operated through its interrupter contact 140 and the normally-closed contact 142 of relay $R_{18}$ until the switch MS steps around to the normal position N whereupon the off-normal contacts $S_5$ and $S_6$ open deenergizing the winding 109 of switch MS and the winding 144 of relay $R_{17}$. The operation of the relay $R_{16}$ results in the breaking of contact 114 removing B+ from the windings of the stepping switches 23, 24, 26 and 28, thus assuring that the coder wheel assemblies do not operate as the master stepping switch MS steps around to its home position N after the reception of a random noise pulse. The mode of operation in response to a random noise pulse has proved to be very useful in eliminating spurious and erroneous indications and accordingly constitutes an important aspect of the system.

Where the first pulse, which it will be observed, is preparatory only and serves (1) to step the master switch MS off the normal position, (2) to deenergize relay $R_{16}$ and (3) to energize relay $R_{17}$, is followed by a second pulse before the time delay period of relay $R_{16}$ has expired, relay $R_{16}$ is not sealed, in but instead the interrupter contact 140 is broken before relay $R_{16}$ becomes reenergized. All the received pulses in the sequence, since they are spaced less than the time delay period, operate thus to step the switch MS one notch. However only positive pulses that actuate relay $R_{10}$ cause the closing of contact 88 of relay $R_{10}$ which is connected to the wiper 84 of switch $S_1$. So, as the wiper 84 steps around contacting the taps 0–8 that are connected respectively to the windings of the relays $R_0$–$R_8$, certain ones of these relays are sealed in by the positive pulses while those other relays receiving negative pulses remain unsealed and unenergized.

The second pulse in the received message determines the type of message that is being received. For example, if the second pulse is positive, the message selector relay $R_0$ is energized and sealed in through its holding contact 98. Also, contact 100 is closed, so that upon the subsequent closing of contact $S_2$, the stepping switches 23 and 24 of coder assemblies $CW_I$ and $CW_{II}$ are energized, corresponding to information concerning bearing. If the second pulse is negative, relay $R_0$ is unaffected and not sealed in. Thus, contact 102 is closed, and, on the closing of switch $S_2$, the stepping switches 26 and 28 of coder-wheel assemblies $CW_{III}$ and $CW_{IV}$ are energized yielding elevation information.

The remaining eight pulses of the received train of pulses contain the stereotyped message, and cause the master stepping switch MS to step around through the remaining 8 positions, e.g. to the open position "9" of the $S_1$ switch, various ones of the relays $R_1$–$R_8$ being energized and sealed in, and others being unenergized and not sealed in according to the polarity of the successive pulses. When the switch MS reaches the "9" position, the power control switch $S_2$ is closed by the contacting of wiper 106 and segment 110, connecting the selected pair of coder wheel assemblies $CW_I$ and $CW_{II}$ or $CW_{III}$ and $CW_{IV}$ to B+ through the closed contacts 112 and 114, conductor 104, either one of the contacts 100 or 102, and the conductors 116 and 118 or the conductors 124 or 126.

The stepping switches of the selected coder wheel assemblies then step around, by means of the interrupter contacts in series with the respective windings, driving the associated cams, until the position of the cam switches is attained for which the connection to ground is broken by the cam contacts.

When each of the stepping switches of the selected coder-wheel assemblies comes to rest with the respective interrupter contacts closed for a period greater than the time-delay period of the relay $R_{16}$, the latter is then operated and sealed in through the contact 152 of relay $R_{17}$, whereupon the master stepping switch MS steps one more notch to home or normal position N, being energized through the off-normal contact $S_5$, the interrupter contact 140, and the contacts 141 and 142 of relays $R_{16}$ and $R_{18}$, respectively. At the home position N, the opening of off-normal contact $S_6$ deenergizes the relay $R_{17}$ and stops the master stepping switch MS. Also, the opening of contact 82 of relay $R_{17}$ removes B+ from the relays $R_0$–$R_8$ and unseals them. The instant position of the two selected coder-wheel assemblies then corresponds to the intelligence contained in the received message.

In the transmission of a message by the apparatus of my invention, a pair of coder-wheel assemblies is preliminarily selected according to the type of message sought to be sent. The cams of the selected pair are then manually rotated, as by manipulation of the indicia wheel 61, for example, until the desired position of the cams is attained corresponding to the message. This rotation sets the various contacts associated with the cams corresponding to the contacts 45 and 47 of cam $C_1$ in coder-wheel assembly $CW_I$. Thus, for transmission, the lower-most pair of contacts associated with each cam $C_1$–$C_{16}$ are employed. And, as noted hereinabove, these contacts are interconnected through the switches $S_3$ and $S_4$ of the master stepping switch MS.

A more complete description of the switching and relay elements employed in the transmission operation will now be given. Again, since the connections of the individual contacts of the respective cams $C_1$–$C_{16}$ are similar and symmetrical, for simplicity, the description of the connections of the contacts 45 and 47 cam $C_1$ will be taken as illustrative of all the other connections.

One of the pair of contacts presently concerned is normally open the other being normally closed. As shown, cam $C_1$ is in the actuated condition since, as noted above, the follower is at a low 27 on the cam. Thus, the normally-open contact 45 is shown closed and the normally closed contact 47 is shown open.

One side of each of the contacts 45, 47 is connected, in common, by conductor 164 to tap "1" of the switch $S_3$, the other side of contact 45 being connected, by conductor 166 to the negative bus 168 of a source of modulating voltage, while the other side of contact 47 is connected to the positive bus 170 of the source.

The lower-most pairs of contacts associated with cams $C_2$–$C_8$ are similarly interconnected to the buses 168, 170 and to the taps "2" through "8" respectively of the switch $S_3$. Tap "9" of switch $S_3$ is open and taps "N" and "0" are connected respectively to negative bus 168 and positive bus 170. The connection of the "0" tap to the positive bus insures the provision of a positive pulse in the second pulse position of the train indicating the message type corresponding to coder-wheel assemblies $CW_I$ and $CW_{II}$.

The lower-most pair of normally open and normally closed contacts of cams $C_9$–$C_{16}$ are connected to the buses 168 and 170 and to the taps "1" through "8," respectively of the switch $S_4$ in a manner similar to that described above. Tap "9" of switch $S_4$ is open and taps "N" and "0" thereof are each connected to the negative bus 168. The connection of the "0" tap of switch $S_4$ to the negative bus ensures the provision of a negative pulse in the second pulse position of the train indicating the message type corresponding to coder-wheel assemblies $CW_{III}$ and $CW_{IV}$.

The wiper 119 of switch $S_3$ is connected to the modulator 13 by conductor 172, through normally-open contacts 174 and 176 of a pair of relays $R_{20}$ and $R_{22}$, respectively, and a normally-closed contact 178 of a time-delay operate relay $R_{21}$ of which the time-delay operation is conventionally illustrated by the dashpot device 180.

The wiper 121 of switch $S_4$ is connected to the modulator 13 through conductor 182, a normally-open contact 184 of relay $R_{23}$, conductor 186, and the contacts 174 and 178.

A pair of pushbutton switches $P_1$ and $P_2$ actuating contacts 188, 190 and 192, 194, respectively, are shown in the lower left-hand portion of FIG. 1*a*, either of which, when momentarily closed, initiates the transmission process. One side of each of the contacts 188–194 is connected to ground through a normally-closed contact 196 of relay $R_{17}$. Contact 190 of button $P_1$ and contact 194 of button $P_2$ are jointly connected through the winding of relay $R_{18}$ to B+. Contact 188 of button $P_1$ is connected to B+ through the winding of relay $R_{22}$, and contact 192 of button $P_2$ is connected to B+ through the winding of relay $R_{23}$. Contact 192 is also connected to ground through a normally-open contact 197 of relay $R_{23}$ in series with a normally-open contact 198 of relay $R_{17}$.

The winding of relay $R_{19}$ is connected between B+ and ground through a pair of branched paths one of which includes a normally-open contact 200 of relay $R_{18}$, the other path being provided by a series connection of normally-open contacts 202 and 204 of relays $R_{17}$ and $R_{19}$, respectively.

The winding of the time-delay release relay $R_{20}$ is connected between B+ and ground by a series circuit of a normally-open contact 206 of relay $R_{19}$ and a normally-closed contact 208 of relay $R_{21}$.

The winding of the time-delay operate relay $R_{21}$ is connected between B+ and ground through a normally-open contact 210 of relay $R_{20}$.

Relay 19 actuates an additional normally-closed contact 212, which, as shown, is in the line feeding the input circuit to the receiver and detection apparatus 17 to disconnect the same during the transmission process.

In the transmission of a message, and assuming that the indicia wheels have been rotated to the indicated portions (each displaying a decimal 7), the closing of pushbutton $P_1$ causes information in the coder-wheel assemblies $CW_I$ and $CW_{II}$ to be transmitted. The button $P_1$ should be held closed long enough for the master stepping switch MS to step away from the home or normal position N. The sequence of operation will now be described.

Relays $R_{18}$ and $R_{22}$ are momentarily energized through the normally-closed contact 196 of relay $R_{17}$, and contact 136 of relay $R_{18}$, in closing, shunts the off-normal contact $S_5$. Also, when contact 200 of relay $R_{18}$ closes, relay $R_{19}$ is energized, which by the closing of its contact 206 results in the energization of relay $R_{20}$. The closing of contact 174 of relay $R_{20}$ and contact 176 of relay $R_{22}$ results in the application of a negative voltage from the N position of switch $S_3$ to the modulator 13 through the conductor 172 and contacts 176, 174 and 178 to form the first output pulse.

The closing of contact 138 of relay $R_{20}$ also results in the energization of the winding 109 of the master stepping switch MS through contact 136 of relay $R_{18}$, contact 138 of relay $R_{20}$ and contact 139 of relay 21, so that the switch MS steps one notch to the "0" position of switch $S_3$.

As soon as the switch MS steps from the home position N, relay $R_{16}$ is deenergized by the breaking of interrupter contact 148; the off-normal contact $S_6$ closes causing energization of relay $R_{17}$ through the circuit including conductors 143 and 145. Relay 17 actuates contacts 202 and 198 thereof, sealing in relays $R_{19}$ and $R_{22}$, respectively.

All the foregoing operations take place in a relatively brief time interval and, as mentioned above, pushbutton $P_1$ may be released as soon as the master stepping switch steps off the home or normal position N. Release of the button $P_1$ causes relay $R_{18}$ to drop out since the latter is not sealed in. The first output or preparatory pulse is terminated by the operation of the time-delay operate relay $R_{21}$, which is energized and operated a brief interval after the closing of contact 210 of relay $R_{20}$. The operation of relay $R_{21}$ also opens normally-closed contact 139 thereof thereby deenergizing the winding 109 of the master stepping switch MS placing the latter in readiness to be stepped again.

After a brief release delay from the time that relay $R_{21}$ operates, relay $R_{20}$ is deenergized by the opening of normally-closed contact 208 of relay $R_{21}$, relay $R_{21}$ is deenergized due to the opening of the normally-open contact 210 of relay $R_{20}$, and relay $R_{20}$ is reenergized because of the closing of normally-closed contact 208 of relay $R_{21}$. Thus, the modulator 13 is again supplied with a voltage, this time a positive pulse from tap "0" of switch $S_3$ through conductor 172, contacts 176, 174 and 178, indicating the message to follow is of the type characterized by coder-wheel assemblies $CW_I$ and $CW_{II}$. This pulse is terminated upon the operation of the time-delay operation relay $R_{21}$ opening its normally-closed contact 178. The second pulse, being positive operates to seal in the relay $R_0$ on the receiving station routing the message to the $S_3$ switch thereof and to the coder-wheel assemblies $CW_I$ and $CW_{II}$.

The cycle of pulse transmission and stepping continues as described, each pulse transmitted being of polarity depending upon the setting of the corresponding pair of lowermost contacts, such as the contacts 45 and 47 of cam $C_1$, which as described above, is controlled by the setting of the coder-wheel assemblies.

It will be noted that if pushbutton $P_2$ had been actuated, the second pulse would have been negative in polarity, the "0" tap of switch $S_4$ being connected to the negative bus 168. Such a negative second pulse has no effect on relay $R_0$ in the receiving station resulting in the routing of the message to the switch $S_4$ thereof and thence to the coder-wheel assemblies $CW_{III}$ and $CW_{IV}$. Otherwise, the operation of transmission from the assemblies $CW_{III}$ and $CW_{IV}$ through the contact 184 of relay $R_{23}$ instead of the contact 176 of relay $R_{22}$ is the same as described in connection with the assemblies $CW_I$ and $CW_{II}$.

The stepping of switch MS continues until switch MS reaches home position, whereupon the off-normal contact $S_6$ opens deenergizing winding 144 of relay $R_{17}$ breaking contact 152 thereof. Relay $R_{16}$ is again energized through the interrupter contact 148 of the switch MS and the interrupter contacts 156, 158, 160 and 162 of the coder-wheel stepping switches 26, 28, 24 and 23, respectively, and the apparatus is again ready to receive or transmit a message.

It is to be noted particularly that when relay $R_{18}$ is energized by pushing one or the other of the buttons $P_1$ or $P_2$, the normally-closed contact 142 thereof opens so that the winding 109 of the master stepping switch MS is not at first energized through the interrupter contact 140 thereof, but rather through the contacts 139 and 138 of relays $R_{21}$ and $R_{18}$, respectively and contact 136 of relay $R_{18}$. Thus, when the switch MS steps off the home position N, and energizes relay $R_{17}$ through the off-normal contact $S_6$, relay $R_{19}$ is then sealed in through contact 202 of relay $R_{17}$ and contact 204 of relay $R_{19}$. Relay $R_{19}$ is thus held in during the entire transmitting operation, and by the opening of normally-closed contact 212 thereof, the amplifier 17 is isolated from the transmission line 15 so that transmitted signals are not fed back to the transmitting apparatus.

Also, during the entire transmission period, the normally-closed contact 112 of relay $R_{19}$, being then in open condition, isolates from B+ the operating windings of the stepping switches 23, 24, 26 and 28 of the coder-wheel assemblies so that they are maintained deenergized. Absent such as isolation contact, the coder-wheel stepping switches would tend to position themselves to correspond to the deenergized relays $R_0$–$R_8$ when the master switch MS reached the "9" position.

It will be observed further that the ground connection from pushbuttons $P_1$ and $P_2$ is made through normally-closed contact 196 of relay $R_{17}$. Accordingly, transmission of a message cannot be commenced except when the switch MS is in the normal position N when relay $R_{17}$ is deenergized. In this manner, transmission of a message is prevented during the time that the switch MS is stepping around to normal or home N as a result of a random noise pulse or during the reception of a message.

The width and spacing of the transmitted pulses, it will be noted, are determined accurately and solely by the time delay periods of the relays $R_{21}$ and $R_{20}$ of which the normally-closed and normally-open contacts 178 and 174, respectively, are in series circuit with the input of the modulator 13. The pulse width and spacing is thus equal to the respective periods of time during which the relays $R_{20}$ and $R_{21}$ are simultaneously energized and deenergized.

While I have illustrated and described particular embodiments of my invention, it will, of course, be understood that various changes and modifications may be made, and I contemplate by the appended claims to cover all such changes and modifications as fall within the true spirit and scope of my invention.

What I claim as new and desire to secure by Letters Patent of the United States is:

1. A transmit-receive station for a communication system comprising a wave energy transmitter and a wave energy receiver mutually adapted for exchanging information with a similar remote station linked therewith; translating means for encoding and decoding having dual actuation means and condition responsive elements coupled with both said actuation means and storing said information corresponding to actuation in coded form, one of said actuating means being locally actuated by decoded information, means coupled to said condition responsive elements for transforming said coded information into a train of electric impulses having a characteristic corresponding thereto, means coupling said train of electric impulses to said transmitter for emission to a remote station of a pulse modulated wave corresponding to said train of impulses, means coupled to the output of said wave energy receiver for transforming a received train of electric impulses into coded information, additional means for storing information coupled to said last recited transformation means, means for energizing the other of said actuating means to thereby sweep said translating means through successive conditions, means coupled jointly to said condition responsive elements and to said storage means for sensing correspondence between the setting of said translating means and said stored information and thereby de-energizing said second actuating means at correspondence.

2. A transmit-receive station as set forth in claim 1, wherein said first and second transformation means are separate switching elements having common driving means.

3. As set forth in claim 1, wherein said coded information is binary information and said condition responsive elements and said additional storage means each comprise a plurality of bistable elements.

4. A transmit-receive station for a communication system comprising a wave energy transmitter and a wave energy receiver mutually adapted for exchanging information with a similar remote station linked therewith; translating means for encoding and decoding having dual actuation means and dual condition responsive elements coupled with both said actuation means and storing said information corresponding to actuation in coded form, one of said actuating means being locally actuated by decoded information, means coupled to one group of said condition responsive elements for transforming said coded information into a train of electric impulses having a characteristic corresponding thereto, means coupling said train of electric impulses to said transmitter for emission to a remote station of a pulse modulated wave corresponding to said train of impulses, means coupled to the output of said wave energy receiver for transforming a received train of electric impulses into coded information, additional means for storing information coupled to said last recited transformation means, means for energizing the other of said actuating means to thereby sweep said translating means through successive conditions, means coupled jointly to the other group of said condition responsive elements and to said additional storage means for sensing correspondence between the setting of said translating means and said stored information, and thereby de-energizing said second actuating means at correspondence.

5. A transmit-receive station as set forth in claim 4, wherein said first and second transformation means are separate switching elements having common driving means.

6. As set forth in claim 4, wherein said coded information is binary information and said condition responsive elements and said additional storage means each comprise a plurality of bistable elements.

7. As set forth in claim 6, wherein said first group and second group of condition responsive elements are two electrically separate groups of switching members, paired sets of which have common actuation means.

References Cited in the file of this patent

UNITED STATES PATENTS

| | | |
|---|---|---|
| 2,207,743 | Larson | July 16, 1940 |
| 2,397,604 | Hartley | Apr. 2, 1946 |
| 2,444,950 | Nichols | July 13, 1948 |
| 2,689,950 | Bayliss | Sept. 21, 1954 |
| 2,719,284 | Roberts | Sept. 27, 1955 |